Jan. 27, 1970     J. H. BORNZIN ET AL.     3,492,035
TWINE KNIFE, KEEPER BLADE ACTUATED
Filed July 1, 1968     5 Sheets-Sheet 4
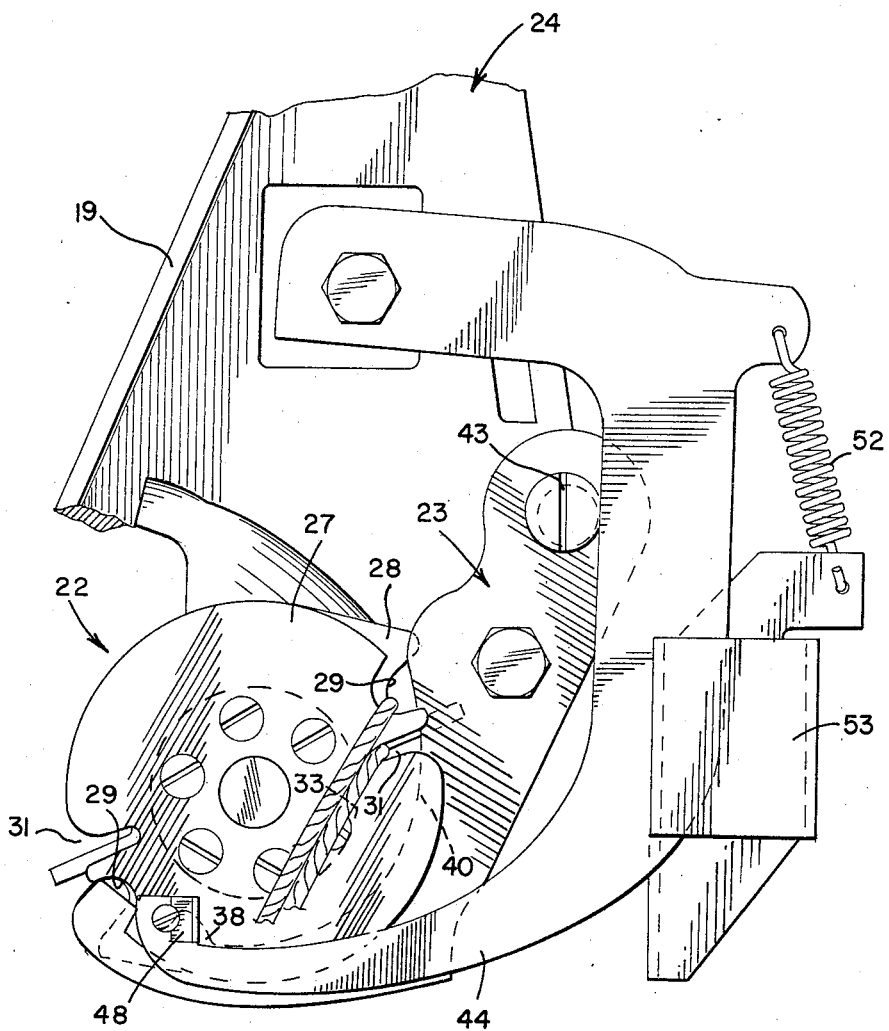
$\boxed{FIG\_5}$
INVENTOR
JAMES H. BORNZIN
HOMER N. GRILLOT
BY
*Robert L. Graham*
ATT'Y.

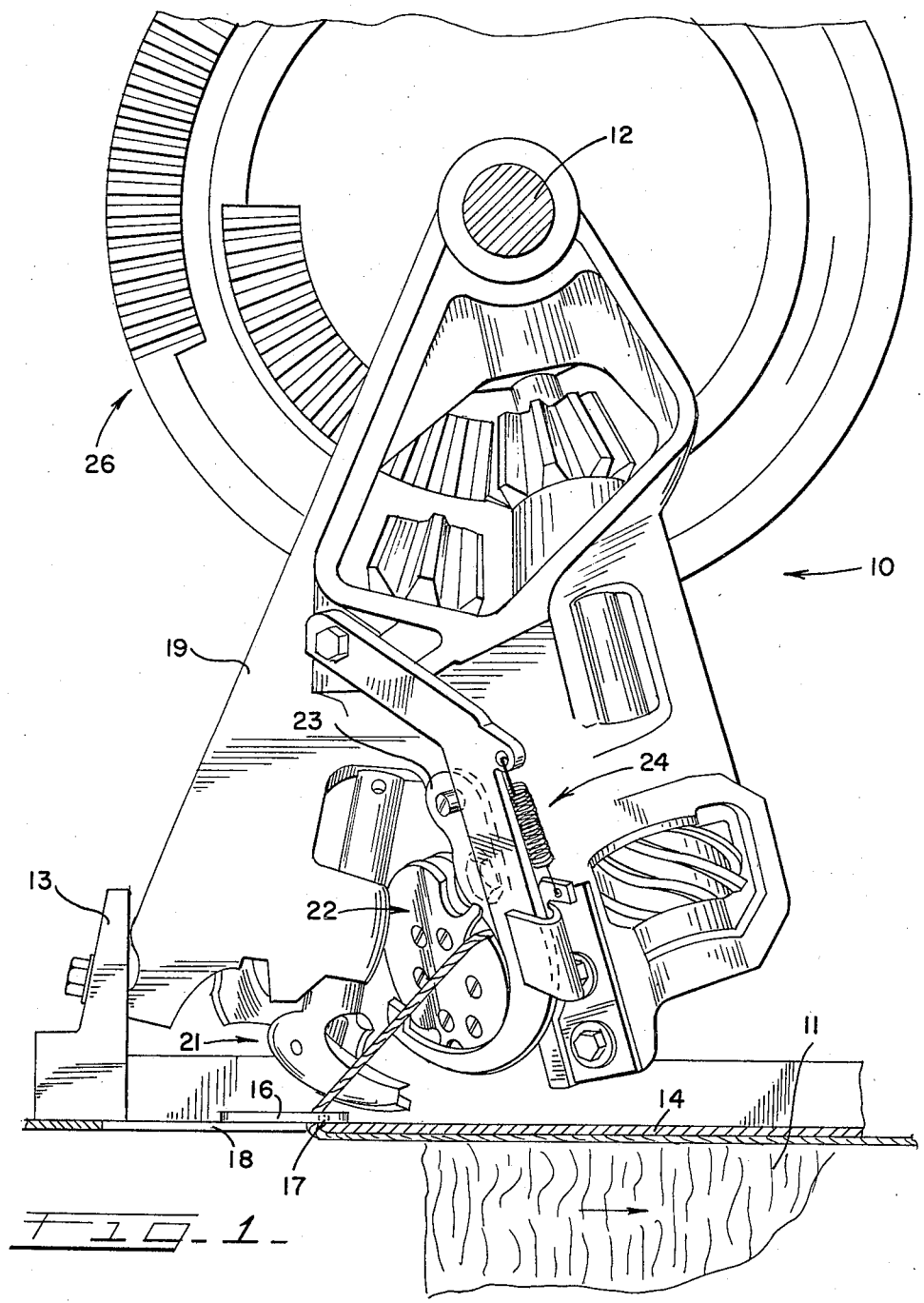

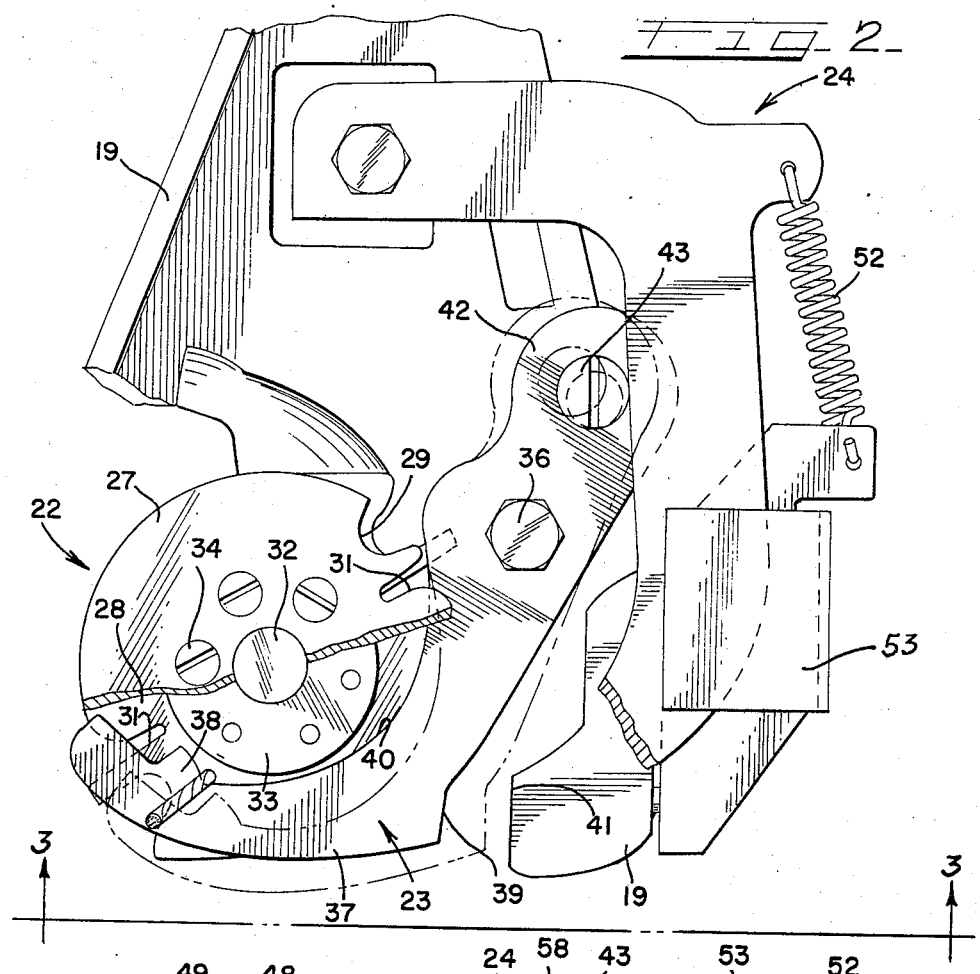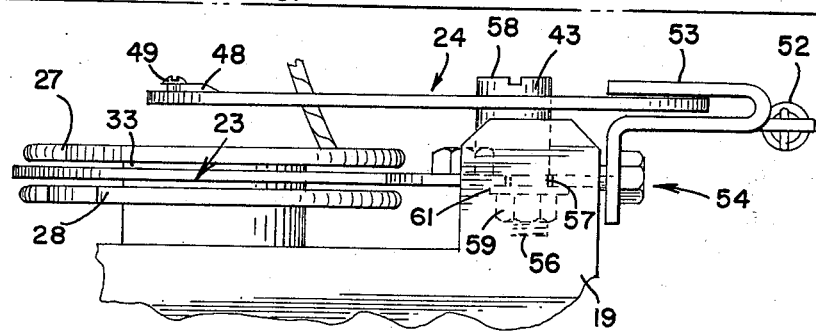

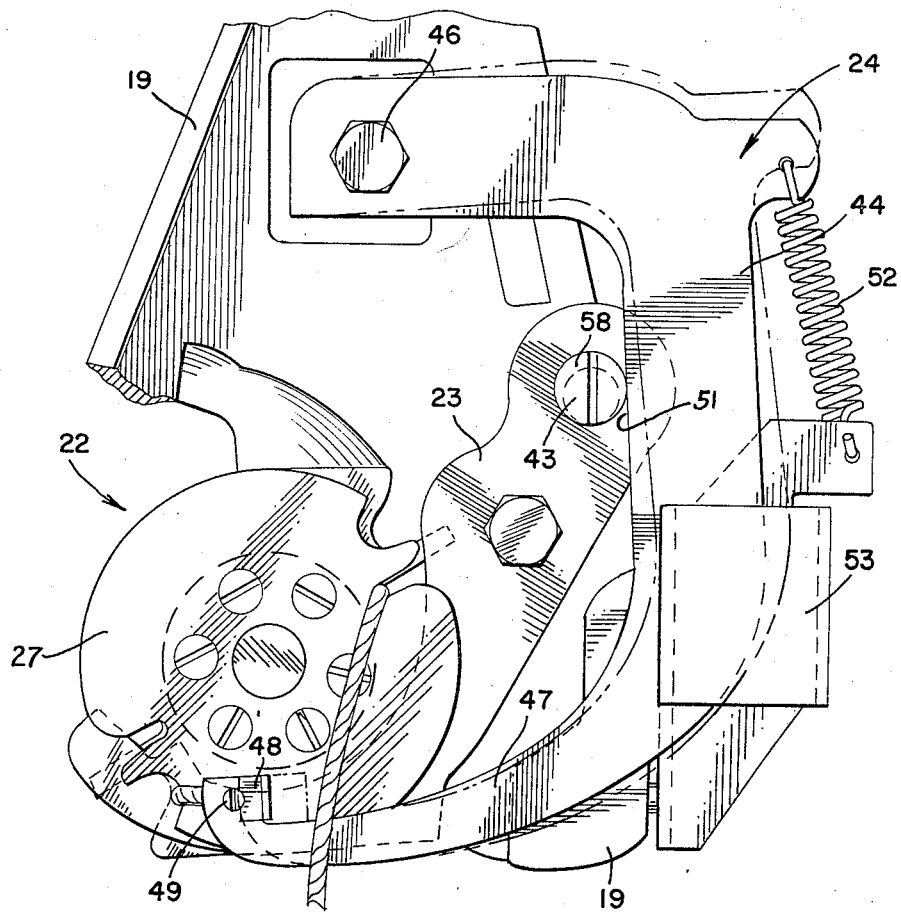

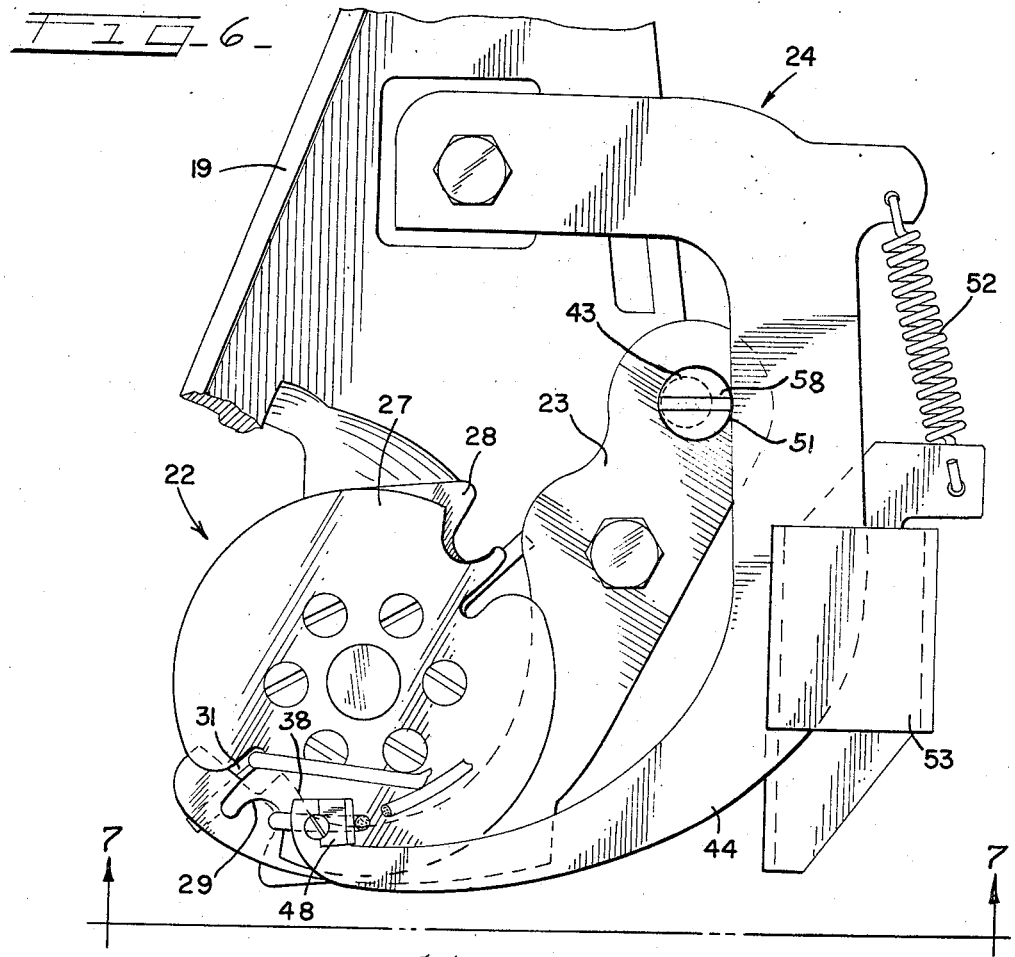
FIG-6-
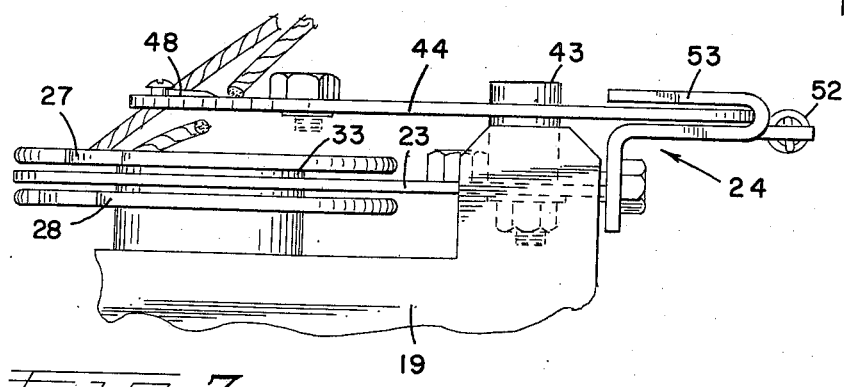
FIG-7-

United States Patent Office 3,492,035
Patented Jan. 27, 1970

3,492,035
TWINE KNIFE, KEEPER BLADE ACTUATED
James H. Bornzin, La Grange, and Homer N. Grillot, Naperville, Ill., assignors to International Harvester Company, Chicago, Ill., a corporation of Delaware
Filed July 1, 1968, Ser. No. 741,416
Int. Cl. B65h 69/04
U.S. Cl. 289—14                                                  8 Claims

ABSTRACT OF THE DISCLOSURE

A baler knotter having a rotary hook assembly, a cord holder assembly and a knife assembly. The cord holder assembly, movable between a twine receiving position and a twine holding position, carries twine between two angularly spaced positions. The knife assembly is movable in a cutting stroke to sever twine carried by said cord holder assembly, said movement being responsive to the holding force exerted on said twine by said cord holder assembly.

BACKGROUND AND SUMMARY OF THE INVENTION

The present invention relates generally to baler knotters and more specifically to a holding and cutting assembly adapted to a conventional type knotter.

The function of the baler knotter is to bind hay compressed in the baling machine into a self-sustaining bundle. The knotter includes several components which must be precisely timed or coordinated to satisfactorily tie the strand of twin encircling the compressed material within the time limits inherent in the baling operation. One of the main causes for the knotter to miss or malfunction is the knotter timing which refers to the action of the knife in relation to the other knotter parts. Conventionally, this type knotter uses a stationary knife which requires the cord holder assembly to pull the twine carried thereby past the blade to effect the cutting acion. This arrangement requires the knife to be precisely timed in relation to the cord holder assembly. If due care is given to the timing, the stationary knife arrangement works satisfactorily for a given set of conditions. However as the condition of the twine changes and as the blade becomes dulled from use, the assembly must be retimed and the blade changed.

The general purpose of the present invention is to minimize the criticality of knotter timing and to extend the life of the blade. The invention contemplates the use of a knife driven through a cutting stroke to effect the cutting action and thereby enlarge the timing range within which the cutting action may occur. Since it is obvious that the cutting action must occur only after the cord holder has attained a sufficient holding force on the twine, the present invention provides means for moving the knife in its cutting stroke in response to the holding force of the cord holder assembly.

Briefly the objects of this invention are as follows:

To lend versatility to a baler knotter by providing a knife assembly capable of handling a wide variety of twines at varying conditions;

To provide a baler knotter with a knife movable in a cutting stroke to effect the cutting action;

To provide a knife movable in a cutting stroke in response to the holding action of its associated cord holder assembly; and To provide a knotter with a knife movable in a cutting stroke in response to movement of the keeper blade of the cord holder assembly.

These and other objects of the present invention will be better understood from the following disclosure taken in conjunction with the attached drawings.

DESCRIPTION OF THE DRAWINGS

FIGURE 1 is a perspective view of the knotter equipped with the novel cutting knife of this invention;

FIGURE 2 is an enlarged fragmentary view of the knotter showing the relationship of the knife and the cord holder assembly;

FIGURE 3 is a side view of the cord holder and cutting assemblies shown in FIGURE 2, and as seen generally from the plane indicated by line 3—3 thereof;

FIGURE 4 is a view similar to FIGURE 2 illustrating the relationship of the knife assembly and the cord holder assembly;

FIGURE 5 is a view of the knife and cord holder assemblies shown in FIGURE 2 and illustrating an early stage of cord holder assembly operation in the tying cycle;

FIGURE 6 is another view of the cord holder and knife assemblies showing a later stage in the holding and cutting operation;

FIGURE 7 is a side view of the cord holder and cutting assemblies shown in FIGURE 6 and as viewed generally from the plane indicated by line 7—7 thereof.

DESCRIPTION OF THE PREFERRED EMBODIMENT

In order to appreciate the full effect of the present invention it is necessary to understand the operation of the knife assembly in relation to the other parts of the baler knotter. As shown in FIGURE 1 a knotter 10 is mounted above a baling chamber 11 of a conventional baling machine. The knotter 10 is supported at the top by a drive shaft 12 and at the bottom by an anchor member 13. A breast plate 14 enclosing the top of the baling chamber 11 has mounted thereon a member 16 having a finger 17 projecting over an elongate slot 18 formed in the breast plate 14. The slot 18 receives a twine carrying needle (not shown) as it delivers twine to the knotter 10.

A frame 19 supports the various components of the knotter 10 including a knotter hook assembly 21, a twin disc assembly 22, a keeper blade 23, a knife assembly 24, and drive gearing 26. The combined action of the assembly 22 and the keeper blade 23 operates to hold the twine, hence the combination may be, and often is, referred to as the cord holder assembly. Except for the keeper blade 23 and the knife assembly 24 the knotter 10 shown in FIGURE 1 is conventional and operates in a conventional manner to tie a knot in a strand of twine encircling a bale formed in the baling chamber 11. The present invention is concerned with the assemblies for cutting the twine after the knot is formed which is the final step in the tying cycle.

For the purposes of this invention, the novel knife assembly 24 may be described in relation to the disc assembly 22 and keeper blade 23, keeping in mind their respective functions in relation to the other parts operative in the tying cycle. As shown in FIGURE 2 the disc assembly 22 includes a front disc 27 and rear disc 28, each having a pair of diametrically opposite shallow notches 29 and a pair of diametrically opposite deep notches 31. The discs 27 and 28 are mounted on a shaft 32 and are separated by hub 33. Discs 27 and 28 are maintained in assembled relation by a plurality of screws 34 which secure the front disc 27 to the intermediate hub 33 which is integral with the rear disc 28.

The keeper blade 23 is pivotally mounted on the frame 19 by means of a bolt 36 and has an arcuate portion 37 interposed between the axially spaced discs 27 and 28. An inner surface 40 of the arcuate portion 37 is profiled to follow generally the curvature of the disc 27 but spaced radially inwardly thereof. At the outer extremity of the arcuate portion 37 is a hump 38 which projects sharply radially inwardly from the profiled surface 40. The outer surface of the keeper blade 23 has formed therein a projection 39 which rests on a shoulder 41 formed in the frame 19 with the keeper blade 23 in the normal position (broken line position of FIGURE 2).

Extending outwardly from the fulcrum defined by bolt 36 is another portion 42 which carries a lug 43 thereon. The lug 43 is aligned with a portion of a knife assembly 24 to engage a surface thereof so that movement of the keeper blade 23 is transmitted to the knife 24. Now as twine is delivered to the shallow notches 29 by the baler needle (not shown) the disc assembly 22 begins rotating. The assembly 22 is rotated from a home, strand-receiving position to a strand-holding position 180° angularly displaced therefrom so that the positions of the diametric notches 29 and 31 are reversed. In the angular movement of the disc assembly 22 the twine spanning the axial space between the discs 27 and 28 and lodged in the notches 29 and 31 is moved through the annulus defined by the profiled surface 40 and the periphery of hub 33. Now as the disc assembly 22 approaches its holding position twine in the shallow notch engages the hump 38 of the keeper blade 23 pulling the keeper blade 23 to its holding position; that is to say the keeper blade 23 moves from the broken line to the solid line positions of FIGURE 2. The relationship of the keeper blade 23 and the twin discs 27 and 28 exerts a holding force on the twine carried in the shallow notch 29. The pivotal movement of the keeper blade 23 about the bolt 36 moves the lug 43 from the broken line to the solid line position of FIGURE 2 and imparts corresponding movement to the knife 24 as described below.

Referring to FIGURE 4 the knife assembly 24 includes a blade holder 44 pivotally mounted on the frame 19, and a blade 48 mounted on the distal end of holder 44. The holder 44 is a plate-like member secured to the frame 19 by bolt 46 and has an arcuate portion 47 extending generally parallel to and adjacent the front disc 27. The blade 48 is secured to the outer end of portion 47 by set screw 49. As best seen in FIGURE 3 the blade 48 is axially spaced from the front disc 27 so that a twine tail of sufficient length is provided to preclude twine slippage past the keeper blade 23. An intermediate portion 51 of the holder 44 is profiled to cooperatively engage the lug 43, the engagement providing the contact surface for the transmittal of forces from the keeper blade 23 to the knife 24.

A tension spring 52 interconnects the holder 44 and a guide 53 bolted to the frame 19 as shown at 54 (see FIGURE 3). The force of spring 52 opposes the force imparted by the keeper blade 23 on the holder 44 so that the knife assembly 24 is urged in a normal inoperative position (the solid line position of FIGURE 4). The spring 52 also urges the holder 44 into constant engagement with the lug 43. Thus it is seen that the knife blade 48 is movably responsive to movement of the keeper blade 23 which in turn is movable responsive to the holding force attained on the twine carried by the twin disc assembly 22. As best seen in FIGURE 3, the guide 53 receives a portion of the holder 44 retaining it in planar alignment and providing means for resisting thrust forces imparted by the twine on the blade 48.

By the action of the keeper blade 23 described above the holder 47 and hence the blade 48 is driven through a cutting stroke from the normal, solid line position of FIGURE 4 to the broken line position.

In order to provide an adjustment feature on the knife 24 the lug 43 is attached to the keeper blade 23 for turning movement about an eccentric axis. As shown in FIGURE 3 a stud 56 depending from the lug 43 is received in a hole 57 formed in the keeper blade 23. The stud 56 is eccentrically disposed with respect to the axis of the lug 43 so that a lobe portion 58 extends outwardly from the axis defined by the stud 56. The assembly is secured to the plate by means of a nut 59 and lock washer 61. Now by turning the lug 43, the lobe portion 58 adjusts the position of the knife blade 48 in relation to the keeper blade 23, whereby the timing may be accurately adjusted, i.e. the lobe 58 positioned to engage the blade holder 44 (see FIGURE 6) advances the cutting action in the tying cycle, whereas lobe 58 positioned away from the holder 44 (see FIGURE 4) retards the cutting action.

The operation of the holding and cutting assemblies of this invention will be described with reference to FIGURES 1, 5, 6, and 7 illustrating the various stages in the holding and cutting sequence.

At the beginning of the tying cycle, the twin disc assembly 22 is in its strand receiving position (see FIGURE 1) wherein a tail portion of the disc twine is held in the lower shallow notch 29. The disc twine extends around the back of the assembly 22 through the deep notch 31, thence adjacent the hook assembly 21, around the breast plate finger 17 and finally around the bale being formed in the baling chamber 11. Now when the bale is completed, the drive shaft 12 begins driving the knotter parts through the tying cycle. The needle delivers twine to the shallow notch 29, whereupon the disc assembly 22 begins turning carrying the strands lodged in notches 29 and 31 from the strand receiving to the strand holding positions. As shown in FIGURE 5, the strands are moved through the space separating the hub 33 and the profile surface 40. At this stage of the operation the strand tail carried in the shallow notch 29 has passed over the hump 38 and so is no longer held by the keeper blade 23.

Turning now to FIGURES 6 and 7 the disc assembly 22 is approaching its home position and the twine lodged in shallow notch 29 spanning the axial space between the front and rear discs 27 and 28 engages the hump 38. Further movement of the disc assembly 22 towards its holding position causes the keeper blade 23 to move inwardly wherein the strand carried in the shallow notch 29 is wedged between the discs 27 and 28. Pivotal movement of the keeper blade 23 imparts a force on holder 44 by the action of lug 43 on surface 51. Movement of the keeper blade 23 from its normal to its holding position thusly drives the blade 48 in a cutting stroke. The knife blade 48 severs the twine at a point intermediate the front disc 27 and the knotter hook assembly 21 and at a sufficient interval from the front disc 27 to leave an adequate tail portion to preclude slippage. The knife assembly 24 as shown in FIGURE 6 has completed its cutting stroke and the twin disc assembly 22 has reached its holding position. The knife 24 and keeper blade 23 are maintained in the positions shown until the next cycle begins whereupon the held portion is moved past the hump 38 releasing the holding force exerted by the keeper blade 23. The spring 52 then returns the knife 24 and the keeper blade 23 to their normal positions.

Thus it has been demonstrated that the knife assembly 24 of this invention is operative to apply a positive cutting action to sever twine, and the cutting action is responsive to the holding force exerted on twine carried by the disc assembly 22.

Although the preferred embodiment of this invention has been described in particular detail, it should be emphasized that modifications and variations may be made therein without departing from the scope and spirit of the invention.

What is claimed is:

1. A twine holding and cutting assembly for use in a baler knotter, said assembly comprising:
    a frame;
    a pair of axially spaced, notched discs mounted on said frame, said discs being movable to carry twine between two angularly displaced positions;
    a keeper blade movably mounted on said frame and having a portion interposed between said discs, said interposed portion cooperable with said discs to exert a holding force on twine carried by said discs;
    a knife mounted on said frame and movable in a cutting stroke to cut twine carried by said discs;

means for moving said knife in said cutting stroke in response to a predetermined holding force exerted by said portion on said twine; and means for moving said knife in a return stroke.

2. The invention as recited in claim 1 wherein said knife includes a blade holder pivotally mounted on said frame and knife blade mounted on said holder.

said keeper blade having a portion engageable with said holder whereby movement of said knife in said cutting stroke is responsive to movement of said keeper blade;

3. The invention as recited in claim 2 wherein said portion engaging said holder includes adjustment means for advancing and retarding the movement of said knife blade in relation to movement of said keeper blade.

4. The invention as recited in claim 2 wherein said means for moving said knife in said return stroke includes bias means interconnecting said holder and said frame, said bias means operative to move said knife in said return stroke when said keeper blade releases said holding force on said twine carried by said discs.

5. A twine holding and cutting assembly for use in baler knotters, said assembly comprising:

a frame;

a twin disc assembly mounted on said frame;

a keeper blade movably mounted on said frame and having a portion interposed between said discs;

means for turning said disc assembly between a twine receiving position and a twine holding position, said twine carried by said discs adapted to engage said keeper blade, said engagement tending to pull said keeper blade into twine holding relation with said disc assembly;

a knife movably mounted on said frame and including a blade disposed adjacent said disc assembly;

means interconnecting said keeper blade and said knife whereby said knife is moved in a cutting stroke in response to movement of said keeper blade, said blade operative to cut twine carried by said disc assembly as said knife is moved through said cutting stroke; and means for moving said knife in a return stroke.

6. The invention as recited in claim 5 wherein said interposed portion includes a hump positioned to engage twine carried by said disc assembly at a predetermined location between said receiving position and said holding position of said disc assembly, said engagement of said twine on said hump being operative to move said keeper blade into said holding relation, whereby said knife is moved through said cutting stroke.

7. The invention as recited in claim 6 wherein said hump is located slightly in advance of said holding position of said disc assembly so that said knife is moved through said cutting stroke as said disc assembly approaches said holding position.

8. The invention as recited in claim 7 and further comprising means engageable with said knife for guiding said blade in said cutting stroke.

References Cited

UNITED STATES PATENTS

| | | | |
|---|---|---|---|
| 285,330 | 9/1883 | Wilkes | 289—14 |
| 407,734 | 7/1889 | Kunkle | 289—14 |
| 3,370,875 | 2/1968 | Grillot | 289—14 |

LOUIS K. RIMRODT, Primary Examiner